Figure 1:
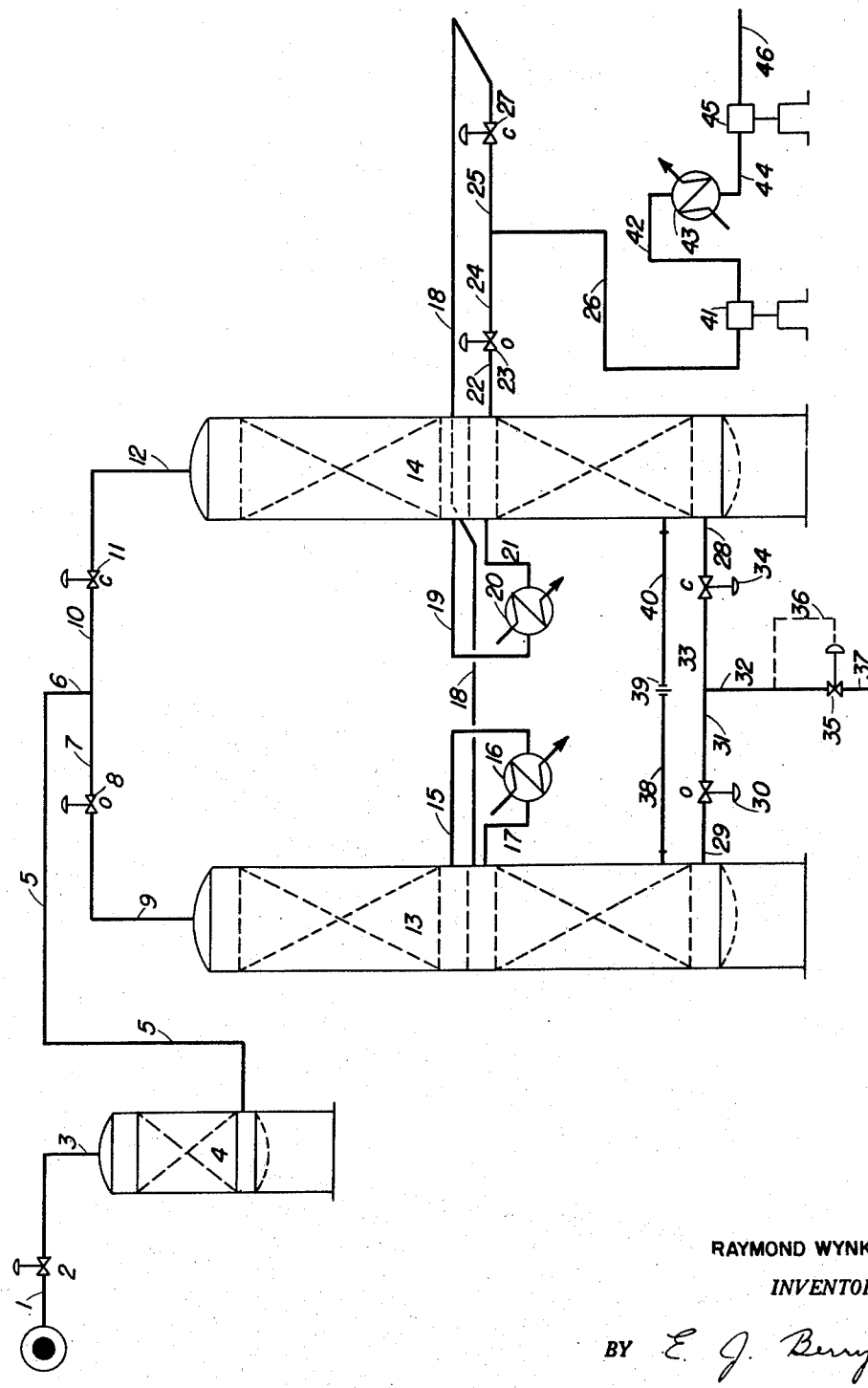

RAYMOND WYNKOOP
*INVENTOR.*

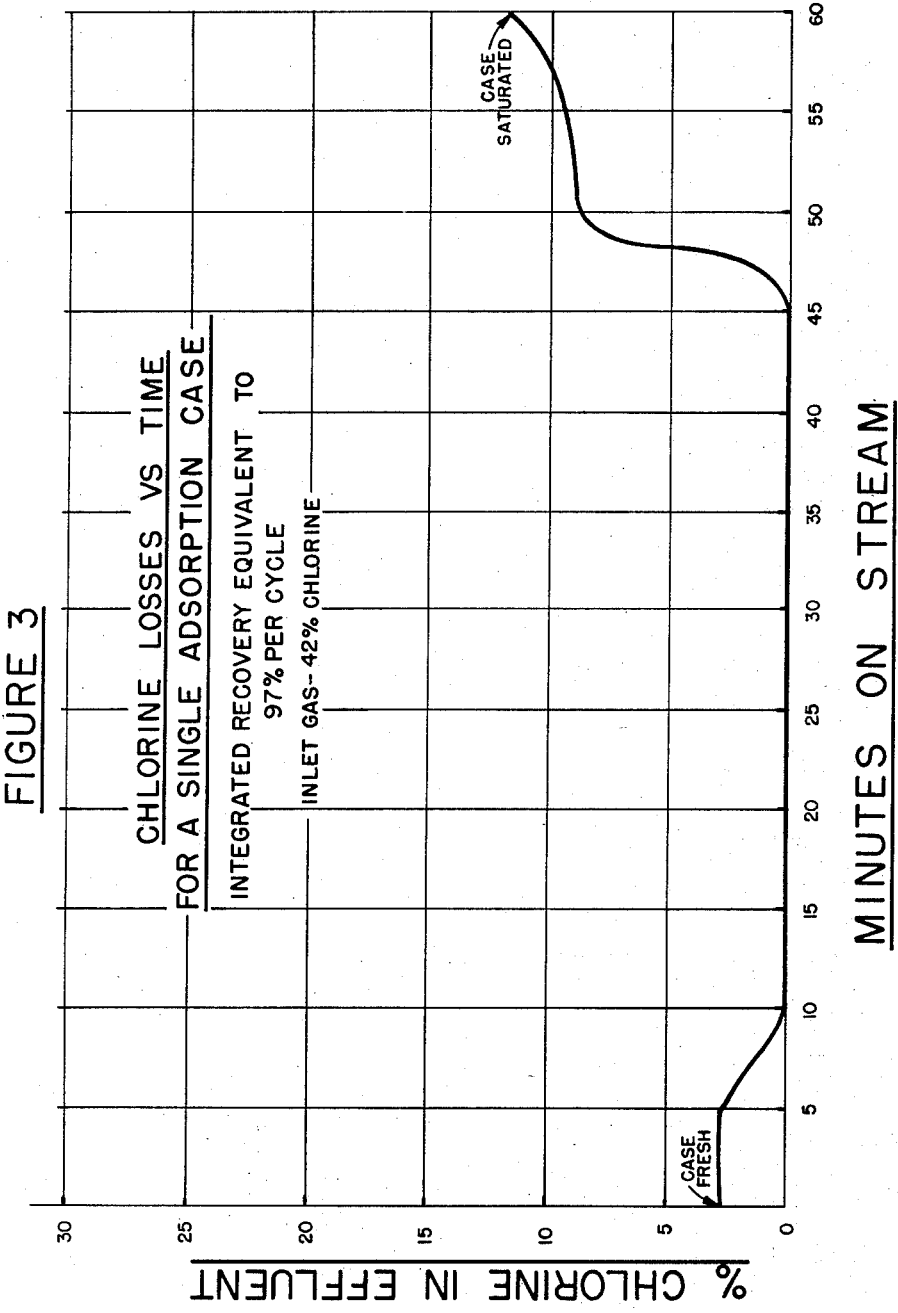

United States Patent Office 2,800,197
Patented July 23, 1957

2,800,197
CHLORINE RECOVERY

Raymond Wynkoop, Metuchen, N. J., assignor to National Distillers and Chemical Corporation, a corporation of Virginia Application December 9, 1955, Serial No. 552,003

2 Claims. (Cl. 183—114.2)

This invention relates to a novel chlorine recovery process and, more particularly, relates to a chlorine recovery process wherein residual chlorine is substantially completely recovered in a continuous manner without neutralization from non-condensible gases containing chlorine in concentrations below about 15%, this recovered chlorine being so recovered as free chlorine.

Chlorine in residual amounts is usually present in outlet streams following normal chlorine recovery operations. The need for the herein described type of chlorine recovery system can occur in a number of ways, for instance, in caustic-chlorine plants wherein aqueous salt solutions are electrolyzed to produce chlorine and caustic soda, or plants wherein fused salt is electrolyzed to chlorine and sodium metal. In general, such plants include those in which a process is operated wherein a metallic halide undergoes electrolysis to produce free chlorine and/or other products. The necessity for special chlorine recovery arises from the fact that while approximately 95–96% of the chlorine can be liquefied and recovered in condensers, the remaining 4 to 5% passes out with the noncondensible gases. In most chlorine producing plants, this so-called "sniff gas" is neutralized with caustic, but according to this invention it is adsorbed in a novel recovery operation and recovered as salable chlorine, likewise increasing caustic production by an amount equivalent to that ordinarily required for neutralization, thereby solving the recovery problem and increasing production at the same time.

The recovery unit consists of at least two towers filled with an efficient chlorine adsorbent such as silica gel. In one embodiment, these two towers are operated in parallel. While one tower is adsorbing chlorine from the chlorine containing gas, the other tower is being evacuated to draw the desorbed chlorine from the adsorbent and return it to the system to be liquefied. Periodically, for instance, approximately once each hour, the towers are switched from adsorption to desorption. Operating thus, approximately 90 to 98% of all chlorine entering these recovery towers in the "sniff gas" is recovered as liquefied or liquefiable chlorine.

In larger scale operations for recovering relatively larger amounts and/or higher concentrations of chlorine, more than two adsorbing towers are conveniently employed. These may be, for instance, employed in series such that the chlorine-containing gas stream is passed through more than one of the adsorbers or towers. Since it is desirable to carry out chemical operations and individual steps in such operations in a continuous or semi-continuous manner, the towers may be employed in sets in parallel in order to facilitate carrying out the adsorption and desorption steps alternately over a long period of continuous operations. The exact time cycle for the alternating steps is varied to provide efficient adsorption and desorption and consequent recovery of chlorine, and the adjustment depends on volume of chlorine-containing gas, size of the adsorption towers, type and condition of adsorbent, temperature, and pressure, as well as other variables.

The process of this invention will be described in greater detail by the following specific examples, although it is not intended to limit the invention in any way thereto.

In one specific embodiment this invention can be illustrated by reference to the attached flow diagram Figure 1, the cycle characteristic diagram, Figure 2, and the time-concentration history of the vent gases from the system, as shown by Figure 3.

Figure 2:
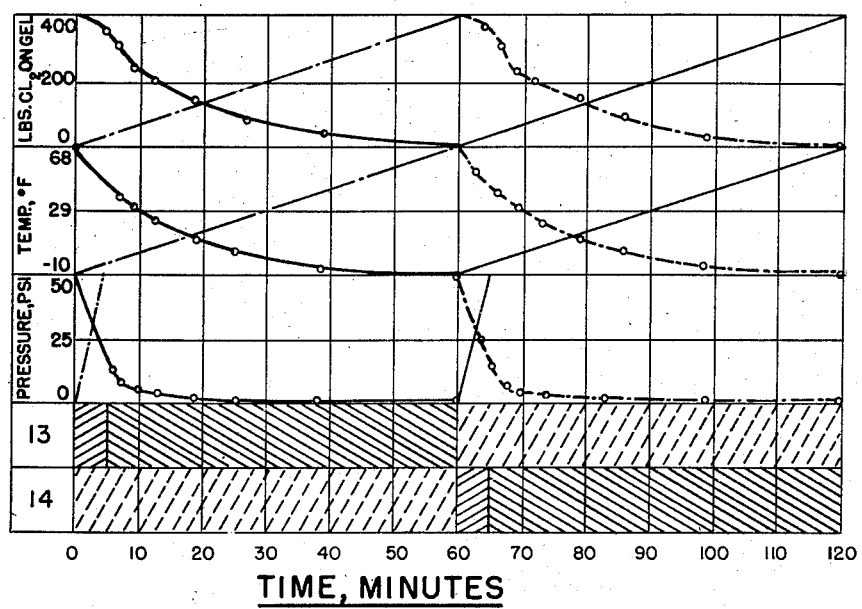
Figure 2:
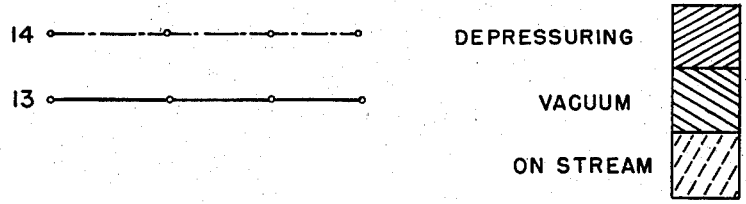

The basic operation of the adsorption system will be clarified by referring to Figure 1. "Sniff gas" from a typical chlorine-caustic soda plant, possibly also containing chlorine and air mixtures from tank car venting or other operations, is introduced into the adsorption unit via line 1. These gases pass through valve 2, which maintains the pressure in the chlorine plant at the necessary operating level. Passing through control valve 2, the gases, by means of line 3, enter guard chamber 4. In the guard chamber 4, which contains a charge of silica gel or other suitable adsorbent, undesirable contaminants, for example, hexachlorethylene, are adsorbed and thus prevented from getting into the main sections of the adsorption towers. The "sniff gas" flows from guard chamber 4 via pipeline 5 to distribution point 6.

At distribution point 6 the gases may flow to either of two cyclically operated adsorption chambers 13 and 14. Alternatively, one chamber is on the adsorption cycle while the other is on the desorption cycle. On Figure 1, in the first portion of the cycle the left-hand chamber 13 is on the adsorption cycle. Thus, the gases flow from distribution point 6 through line 7 to control valve 8 and through control valve 8 and via line 9 to adsorption chamber 13, which is preferably constructed with two separate and approximately equal size beds of silica gel. Operating thus, the network of control valves around the two adsorption chambers, namely control valves 8, 11, 30, 34, 23 and 27, have the positions (open (*o*) and closed (*c*)), as indicated on Figure 1. Under these circumstances chamber 13 has previously been evacuated to a constant low partial pressure of chlorine vapor and the silica gel packing in chamber 13 is relatively free of adsorbed chlorine.

The "sniff gas" enters the upper bed of chamber 13, which upper bed is maintained at a relatively low temperature. The adsorbed chlorine which was pumped out during the previous adsorption-desorption cycle has been evaporated from this bed, and since chamber 13 is suitably insulated in accordance with efficient engineering practices, this bed will have lost most of its sensible heat to provide latent heat of evaporation to the new desorbed chlorine. At this relatively lower temperature, the upper bed in chamber 13 begins to condense chlorine from the "sniff gas" entering through line 9, and simultaneously begins to warm up, and also warming up the partially stripped "sniff gas" flowing through it. Upon reaching the bottom of the top bed in chamber 13, the partially stripped gases are, therefore, appreciably warmer than they were when entering chamber 13. In order to preserve the efficiency of the adsorption operation, at least a part of these gases are withdrawn from the upper section of chamber 13 by means of line 15 and sent through refrigerated heat exchanger 16. The gases which exist from exchanger 16, re-enter chamber 13 at the top of the lower bed of said chamber 13 by means of line 17. The gases now proceed through the bottom bed of chamber 13 wherein additional chlorine is condensed and removed.

The lower bed of chamber 13 has, during a previous pump out or regeneration cycle, been stripped of chlorine by the continuous introduction of a small amount of stripped "sniff gas" from the base of chamber 14 through line 40, restricting orifice 39, and line 38. The lower section of chamber 13, therefore, contains little or no adsorbed chlorine and after contact therewith the sniff gas leaves the lower section of chamber 13 substantially free of chlorine, since there is no chlorine on the solid phase to produce an equilibrium partial pressure. If any substantial amount of chlorine remains in the lower section of chamber 13 immediately following regeneration of chamber 13, the first small portion of "sniff gas" traveling through chamber 13 on the adsorption cycle would strip out this adsorbed chlorine, and an adsorption wave similar to that shown in the lower left-hand corner of Figure 3 would be obtained. By the use of lines 40 and 38 and orifice 39, the chlorine breakthrough shown in the lower left-hand corner of Figure 3 is completely eliminated.

The stripped sniff gas leaves chamber 13 through line 29, control valve 30, lines 31 and 32, pressure control valve 35 (having sense line 36), to the waste disposal line 37. If desired, a small amount of the chlorine-free sniff gas is allowed to flow through line 38, orifice 39, and line 40 to chamber 14, which is on the regeneration cycle.

The regeneration cycle, again assuming that Figure 1 shows a disposition of control valves immediately after the change of cycle, operates as follows. The inlet and outlet control valves 11 and 28 are closed, bottling up the contents of chamber 14. The pump out control valve 23 is simultaneously opened and chamber 14 is connected via lines 22, 24 and 26 to the first stage vacuum pump 41, through cooler 43 (via line 42) to second stage vacuum pump 45, and via line 46 to the chlorine condensing equipment in the main chlorine plant.

Using pumps 41 and 45, the pressure in chamber 14 is lowered, and as the pressure is lowered, adsorbed chlorine begins to evaporate from the silica gel adsorbent therein. Simultaneously, the temperature inside the beds of chamber 14, which has gradually risen during the previous adsorption cycle from about −10° F. to about 68° F., begins to fall because of the latent heat of evaporation being removed by the evaporating chlorine. Under the influence of pumps 41 and 45, the pressure in tower 14 also falls from the main plant pressure to the ultimate vacuum pressure attainable by pumps 41 and 45. The history of each vessel with regard to pressure, temperature, and contained chlorine is shown diagrammatically by Figure 2. After the vacuum pumps 41 and 45 have reduced chamber 14 to the minimum attainable pressure, the cycle is ready to be repeated provided, of course, that chamber 13 has reached the maximum chlorine adsorption possible. The exact cycle length depends on the design of vessels 13 and 14, and proper choice of cycle length can be determined by reference to a plot of chlorine losses versus time such as shown by Figure 3. For example, Figure 3 indicates that, for a particular case, a cycle length of about 90 minutes is optimum although variations can be tolerated.

The placement of line 22 on vessel 14 (or the placement of line 18 on vessel 13) is an important feature of the process of this invention. It serves two purposes. First, it permits the lower section of chambers 13 or 14 to be completely exhausted by the introduction of stripping gas through lines 38 or 40, as the case may be, and thus makes possible an adsorption system which is capable of averaging 100% recovery of the adsorbable component. Second, the placing of line 22 between either of the two adsorption beds permits each bed to be pumped down to a lower equilibrium pressure, for any given vacuum pump capacity, than would be possible if the line were placed at either end of the adsorption chamber. The reason for this is the fact that the pressure drop across each bed is halved by the use of this device.

What is claimed is:

1. A continuous process for the recovery of free chlorine from a chlorine-containing gas stream which comprises (1) passing "sniff gas" consisting substantially of non-condensible gases and having a chlorine concentration below about 15% through a preliminary adsorption zone containing silica gel to remove therefrom contaminants which are more adsorbable than chlorine; (2) on an adsorption cycle: passing said preliminarily-treated "sniff gas" through an adsorption zone containing silica gel, said silica gel being at a temperature lower than said entering "sniff gas" stream, recovering a partially chlorine-stripped gas stream from said adsorption zone, separately cooling at least a portion of said partially chlorine-stripped gas stream, passing said partially chlorine-stripped gas stream to at least one other adsorption zone containing silica gel and recovering therefrom a substantially chlorine-free gas stream; (3) on a regeneration cycle: maintaining at least one adsorption zone containing silica gel having chlorine adsorbed thereon, subjecting said adsorption zone on the regeneration cycle to reduced pressure thereby desorbing said adsorbed chlorine, recovering said desorbed chlorine, and thereafter passing at least a portion of said previously recovered chlorine-free gas stream from the adsorption cycle through said desorbed silica gel to strip the final traces of adsorbed chlorine therefrom; and (4) at intervals reversing the adsorption and regeneration cycles.

2. A continuous process for recovery of free chlorine from a chlorine-containing gas stream which comprises (1) passing said chlorine-containing gas stream through a preliminary adsorption zone containing silica gel to remove therefrom contaminants which are more adsorbable than chlorine; (2) on an adsorption cycle: passing said preliminarily-treated gas stream through an adsorption zone containing silica gel, said silica gel being at a temperature lower than that of the entering gas stream, recovering a partially chlorine-stripped gas stream from said adsorption zone, separately cooling at least a portion of said partially stripped gas stream, passing said cooled partially stripped gas stream to at least one other adsorption zone containing silica gel, recovering therefrom a substantially chlorine-free gas stream; (3) on a regeneration cycle: maintaining an adsorption zone containing silica gel having chlorine adsorbed thereon and at least one other adsorption zone containing silica gel having chlorine adsorbed thereon, subjecting said adsorption zones on the regeneration cycle to reduced pressure thereby desorbing said adsorbed chlorine, recovering said desorbed chlorine, thereafter passing at least a portion of said previously recovered chlorine-free gas stream from the adsorption cycle through said other adsorption zone on the regeneration cycle to strip the final traces of adsorbed chlorine therefrom; and (4) at intervals reversing the adsorption and regeneration cycles.

References Cited in the file of this patent
UNITED STATES PATENTS

| | | |
|---|---|---|
| 1,617,305 | Guyer et al. | Feb. 8, 1927 |
| 2,083,732 | Moore et al. | June 15, 1937 |
| 2,739,670 | Miller | Mar. 27, 1956 |